(12) United States Patent  
Xue et al.

(10) Patent No.: US 7,872,323 B2
(45) Date of Patent: Jan. 18, 2011

(54) MAGNETORESISTIVE DEVICE HAVING SPECULAR SIDEWALL LAYERS

(75) Inventors: Song S. Xue, Edina, MN (US); Paul E. Anderson, Eden Prairie, MN (US); Michael C. Kautzky, Eagan, MN (US); Xuefei Tang, Eden Prairie, MN (US); Patrick J. Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 181 days.

(21) Appl. No.: 11/637,585

(22) Filed: Dec. 12, 2006

(65) Prior Publication Data

US 2007/0097559 A1    May 3, 2007

Related U.S. Application Data

(63) Continuation of application No. 10/702,843, filed on Nov. 6, 2003, now Pat. No. 7,158,353.

(51) Int. Cl.
*H01L 27/22* (2006.01)
(52) U.S. Cl. ............................ 257/427; 257/E21.665
(58) Field of Classification Search ............ 257/427, 257/E21.665
See application file for complete search history.

(56) References Cited

U.S. PATENT DOCUMENTS

| 6,181,534 | B1 * | 1/2001 | Gill .................. 360/324.11 |
| 6,219,208 | B1 * | 4/2001 | Gill .................. 360/324.1 |
| 6,338,899 | B1 * | 1/2002 | Fukuzawa et al. ...... 360/324.12 |
| 6,392,922 | B1 * | 5/2002 | Liu et al. ............... 365/158 |
| 6,754,053 | B2 | 6/2004 | Yoshikawa et al. |
| 2001/0012188 | A1 * | 8/2001 | Hasegawa et al. ...... 360/324.12 |
| 2001/0014000 | A1 * | 8/2001 | Tanaka et al. .......... 360/324.12 |
| 2002/0036876 | A1 * | 3/2002 | Kawawake et al. ....... 360/324.1 |
| 2002/0044394 | A1 * | 4/2002 | Hasegawa ............... 360/324.1 |
| 2002/0048690 | A1 * | 4/2002 | Fukuzawa et al. ........... 428/692 |
| 2002/0055307 | A1 * | 5/2002 | Singleton et al. ........... 439/887 |
| 2002/0064006 | A1 * | 5/2002 | Hasegawa ............... 360/324.12 |
| 2002/0135954 | A1 * | 9/2002 | Yoshikawa et al. ...... 360/324.12 |
| 2002/0135956 | A1 * | 9/2002 | Hasegawa et al. ...... 360/324.12 |
| 2002/0145836 | A1 * | 10/2002 | Gill et al. .............. 360/324.12 |
| 2002/0154538 | A1 * | 10/2002 | Inui ........................ 365/158 |
| 2002/0191354 | A1 * | 12/2002 | Yoshikawa et al. ....... 360/324.1 |
| 2004/0136121 | A1 | 7/2004 | Mao et al. |

* cited by examiner

*Primary Examiner*—Bradley K Smith
*Assistant Examiner*—Alexander Belousov
(74) *Attorney, Agent, or Firm*—Kinney & Lange, P.A.

(57) ABSTRACT

A multilayered magnetoresistive device includes a specular layer positioned on at least one sidewall and a copper layer is positioned between the specular layer and the sidewall.

20 Claims, 4 Drawing Sheets

MAGNETORESISTIVE DEVICE HAVING SPECULAR SIDEWALL LAYERS

CROSS-REFERENCE TO RELATED APPLICATION(S)

This application is a continuation of application Ser. No. 10/702,843, filed on Nov. 6, 2003, now U.S. Pat. No. 7,158,353.

BACKGROUND OF THE INVENTION

The present invention relates generally to the field of magnetic data storage and retrieval systems. More particularly, the present invention relates to a magnetoresistive device with specular layers positioned upon at least one sidewall of the device to increase sensitivity of the device.

In a magnetic data storage and retrieval system, a magnetic recording head typically includes a reader portion having a magnetoresistive (MR) sensor for retrieving magnetically encoded information stored on a magnetic disc. Magnetic flux from the surface of the disc causes rotation of the magnetization vector of a sensing layer or layers of the MR sensor, which in turn causes a change in electrical resistivity of the MR sensor. The sensing layers are often called "free" layers, since the magnetization vectors of the sensing layers are free to rotate in response to external magnetic flux. The change in resistivity of the MR sensor can be detected by passing a current through the MR sensor and measuring a voltage across the MR sensor. External circuitry then converts the voltage information into an appropriate format and manipulates that information as necessary to recover the information encoded on the disc.

MR sensors as presently developed can be characterized in three general categories: (1) anisotropic magnetoresistive (AMR) sensors, (2) giant magnetoresistive (GMR) sensors, including spin valve sensors, and (3) tunneling magnetoresistive (TMR) sensors.

AMR sensors generally have a single MR layer formed of a ferromagnetic material. The resistance of the MR layer varies as a function of $\cos^2 \alpha$, where $\alpha$ is the angle formed between the magnetization vector of the MR layer and the direction of the sense current flowing in the MR layer.

GMR sensors have a series of alternating magnetic and nonmagnetic layers. The resistance of GMR sensors varies as a function of the spin-dependent transmission of the conduction electrons between the magnetic layers separated by the nonmagnetic layer and the accompanying spin-dependent scattering which takes place at the interface of the magnetic and nonmagnetic layers and within the magnetic layers. The resistance of a GMR sensor depends on the relative orientations of the magnetization in consecutive magnetic layers, and varies as the cosine of the angle between the magnetization vectors of consecutive magnetic layers.

TMR sensors have a configuration similar to GMR sensors, except that the magnetic layers of the sensor are separated by an insulating film that is thin enough to allow electron tunneling between the magnetic layers. The tunneling probability of an electron incident on the barrier from one magnetic layer depends on the character of the electron wave function and the spin of the electron relative to the magnetization direction in the other magnetic layer. As a consequence, the resistance of the TMR sensor depends on the relative orientations of the magnetization of the magnetic layers.

For all types of MR sensors, magnetization rotation occurs in response to magnetic flux from the disc. As the recording density of magnetic discs continues to increase, the width of the tracks on the disc must decrease, which necessitates smaller and smaller MR sensors as well. As MR sensors become smaller in size, diffusive electron scattering at the sidewalls of the MR sensor have had a more pronounced effect of both reducing the amplitude of the MR signal and increasing magnetic noise in the MR signal.

BRIEF SUMMARY OF THE INVENTION

A multilayered magnetoresistive device includes a specular layer positioned on at least one of its sidewalls. A copper layer is positioned between the specular layer and the sidewall.

BRIEF DESCRIPTION OF THE DRAWINGS

FIG. 1A is an air bearing view, while

FIG. 5A is an air bearing view, while

DETAILED DESCRIPTION

Figure 1A:
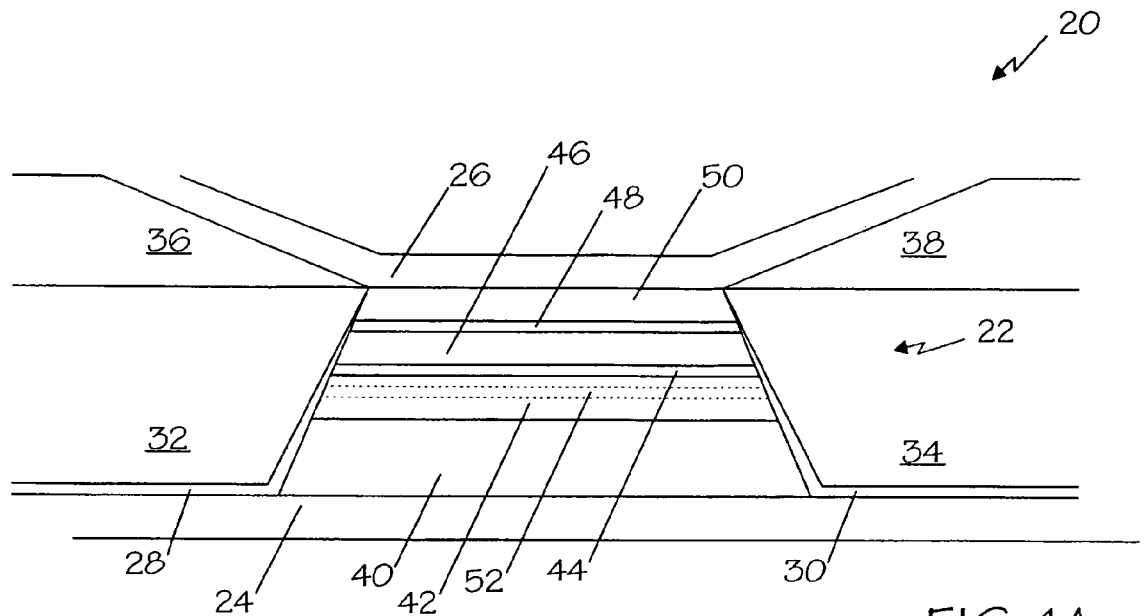
Figure 1B:
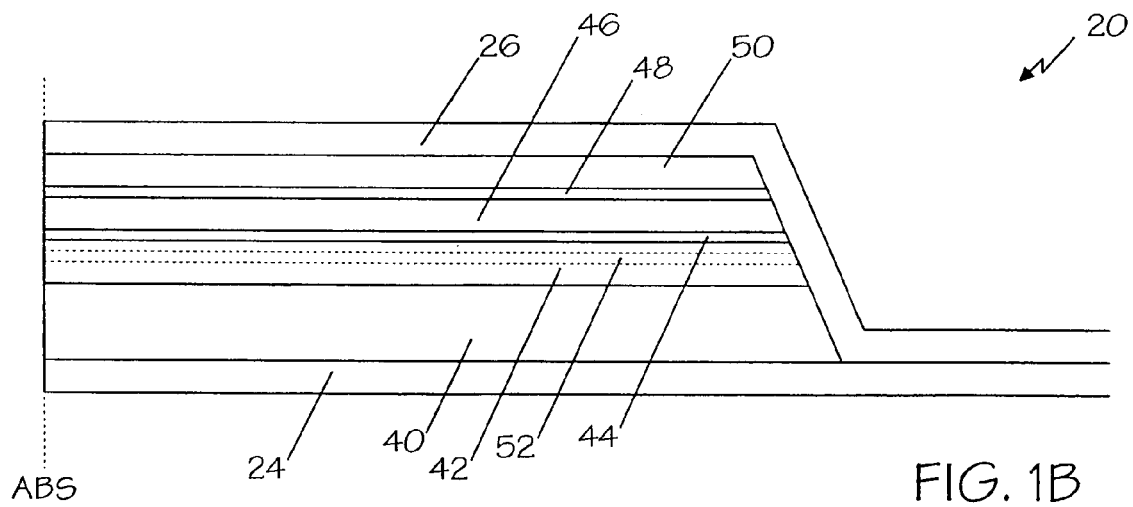
FIG. 1B is a cross-sectional view, of a prior art magnetic recording head having a current-in-plane magnetoresistive sensor with in-plane specular layers.

FIG. 1A is an air bearing view, while FIG. 1B is a cross-sectional view, of prior art magnetic recording head, or transducing head, 20 having current-in-plane (CIP) magnetoresistive (MR) sensor 22, first and second gap layers 24 and 26, first and second seed layers 28 and 30, first and second bias elements 32 and 34, and first and second contacts 36 and 38.

CIP sensor 22 may be any multilayered CIP GMR sensor. However, for illustrative purposes only, CIP sensor 22 is shown as a spin valve sensor having sequentially stacked antiferromagnetic layer 40, synthetic antiferromagnetic (SAF) 42, spacer layer 44, free layer 46, top specular layer 48, and cap layer 50. In this configuration, antiferromagnetic layer 40 is formed of an antiferromagnetic material and is exchange coupled with SAF 42 to fix a magnetization thereof. SAF 42 is formed of a plurality of magnetic layers, each generally formed of a ferromagnetic material, at least two of which are separated by a thin decoupling layer. When the thickness of the decoupling layer is optimized, strong antiferromagnetic coupling is produced between the magnetic layers on opposite sides of the decoupling layer and their magnetizations are antiparallel. SAF 42 as illustrated in FIGS. 1A and 1B also includes bottom specular layer 52 as one of its layers. Spacer layer 44 is formed of a nonmagnetic material and serves to separate SAF 42 from free layer 46. Free layer 46, which is a magnetic layer generally formed of a ferromagnetic material, is often referred to as the sensing layer because its magnetization vectors are free to rotate in response to external magnetic flux. Cap layer 50 protects other layers in CIP sensor 22 from atmospheric damage.

In recent years, GMR sensors have become smaller, with the layers therein becoming thinner. This decrease in thickness has beneficially decreased the shunt loss of sense current traversing the GMR sensor; however, it has also caused an increase in diffusive electron scattering at the antiferromagnetic layer and the cap layer of the GMR sensor, which negatively impacts the amplitude of, and magnetic noise in, the MR signal. To counteract this electron scattering loss, bottom and top specular (mirror) layers 52 and 48 have been layered on opposite sides of free layer 46 in prior art designs to enhance the specular reflection of electrons traversing free layer 46. This enhanced specular reflection results in a reduction of the mean free path of electrons traversing free layer 46 and correspondingly enhances the MR effect of CIP sensor 22. Specular electron scattering in MR devices is discussed in H. J. M. Swagten et al., *Specular Reflection in Spin Valves Bounded by NiO Layers*, IEEE Transactions on Magnetics, v. 34, No. 4, pp. 948-953 (1998), and is hereby incorporated by reference.

Top specular layer 48 is typically formed of a thin oxide film having a thickness in a range of about 5 Angstroms to about 20 Angstroms. Top specular layer 48 is usually formed by first depositing a metal layer of aluminum, tantalum, chromium, silicon, or the like, and then oxidizing the metal layer using a plasma or radical oxidation method.

Bottom specular layer 52 is often formed of a partially oxidized magnetic thin film, such as cobalt-iron, having a thickness in a range of about 5 Angstroms to about 20 Angstroms. Bottom specular layer 52 is commonly formed by first depositing the thin magnetic film and then partially oxidizing the film using a natural oxidation process or an oxygen surfactant.

While bottom and top specular layers 52 and 48 help reduce electron diffusion and scattering at the cap layer and the antiferromagnetic layer of the sensor, we have discovered that as GMR sensors have continued to become smaller, the electron diffusion and scattering at sidewalls of the GMR sensor has also had a pronounced effect on both the amplitude of, and the magnetic noise in, the MR signal. The present invention solves this problem of electron scattering loss occurring at the sidewalls of a GMR sensor by positioning specular layers on at least one sidewall of the sensor.

Figure 2:
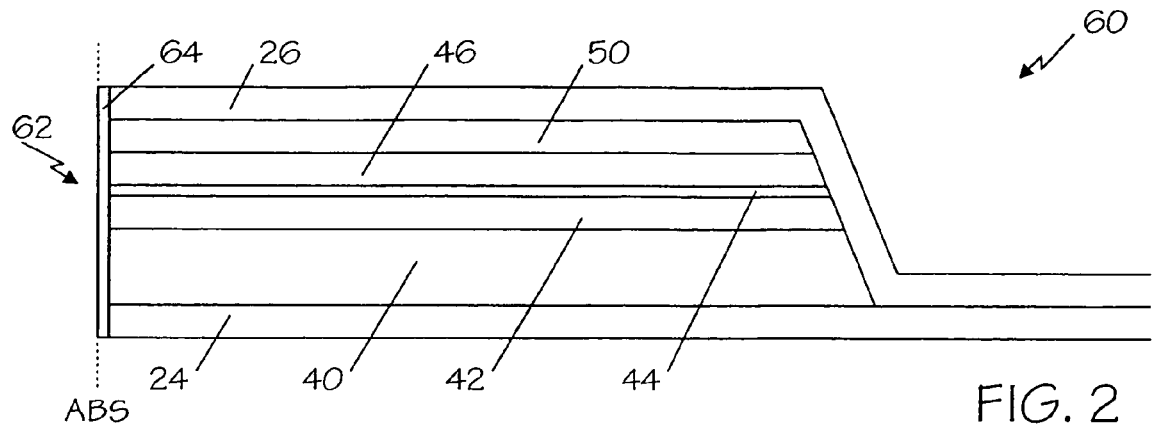
FIG. 2 is a cross-sectional view of a magnetic recording head in accord with the present invention and having a current-in-plane magnetoresistive sensor with a specular layer positioned upon an air bearing sidewall of the sensor.

FIG. 2 is a cross-sectional view of magnetic recording head 60 in accord with the present invention. For ease of description, elements of FIG. 2 that are similar to elements of FIGS. 1A and 1B are similarly numbered and are not separately discussed below.

Magnetic recording head 60 includes multilayered CIP MR sensor 62, first and second gap layers 24 and 26, first and second seed layers 28 and 30 (not shown in FIG. 2), first and second bias elements 32 and 34 (not shown in FIG. 2), first and second contacts 36 and 38 (not shown in FIG. 2), and air bearing specular layer 64 positioned upon an air bearing sidewall of sensor 62. The air bearing sidewall traverses the layers of CIP sensor 62 and is adjacent an air bearing surface (ABS) of magnetic recording head 60.

As in FIGS. 1A and 1B, CIP sensor 62 may be any multilayered CIP GMR sensor. However, for illustrative purposes only, CIP sensor 62 is shown as a spin valve sensor having sequentially stacked antiferromagnetic layer 40, SAF 42, spacer layer 44, free layer 46, and cap layer 50. CIP sensor 62 may also include any of a number of additional layers, including specular layers to enhance the specular reflection of electrons traversing sensor 62.

Air bearing specular layer 64 serves to counteract electron scattering loss occurring at the air bearing sidewall of CIP sensor 62. For ease of fabrication, air bearing specular layer 64 coats the ABS of magnetic recording head 60; however, air bearing specular layer 64 may also be deposited to cover only the air bearing sidewall of CIP sensor 62. Air bearing specular layer 64 is formed by depositing a layer of an oxidizable metal, such as aluminum, chromium, tantalum, titanium, or silicon, and then oxidizing the metal layer using an oxidation method such as plasma oxidation or oxygen radical oxidation. Air bearing specular layer 64 may also be formed of aluminum oxide. Air bearing specular layer 64 preferably has a thickness in a range of about 5 Angstroms to about 20 Angstroms.

When fabricating magnetic recording head 60, an overcoat is generally deposited over the air bearing surface to protect magnetic recording head 60. Thus, an important consideration in selecting a material with which to form air bearing specular layer 64 is whether the material will adhere well with the material forming the overcoat, which is generally carbon or diamond-like-carbon.

Finally, to minimize the possibility of inadvertently oxidizing a critical layer of CIP sensor 62, a thin layer copper may be deposited prior to the deposition of air bearing specular layer 64. This thin copper layer will preferably have a thickness less than about 10 Angstroms.

Figure 3:
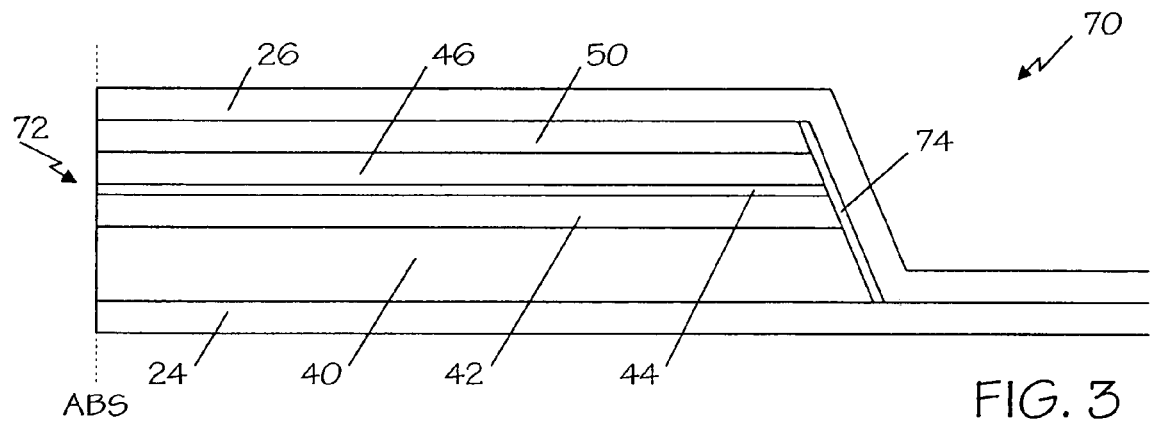
FIG. 3 is a cross-sectional view of a magnetic recording head in accord with the present invention and having a current-in-plane magnetoresistive sensor with a specular layer positioned upon a back sidewall of the sensor.

FIG. 3 is a cross-sectional view of magnetic recording head 70 in accord with the present invention. For ease of description, elements of FIG. 3 that are similar to elements of FIGS. 1A and 1B are similarly numbered and are not separately discussed below.

Magnetic recording head 70 includes multilayered CIP MR sensor 72, first and second gap layers 24 and 26, first and second seed layers 28 and 30 (not shown in FIG. 3), first and second bias elements 32 and 34 (not shown in FIG. 3), first and second contacts 36 and 38 (not shown in FIG. 3), and back specular layer 74 positioned upon a back sidewall of sensor 72. The back sidewall traverses the layers of CIP sensor 72 and is opposite the ABS of magnetic recording head 70.

CIP sensor 72 may be any multilayered CIP GMR sensor. However, for illustrative purposes only, CIP sensor 72 is shown as a spin valve sensor having sequentially stacked antiferromagnetic layer 40, SAF 42, spacer layer 44, free layer 46, and cap layer 50. CIP sensor 72 may also include any of a number of additional layers, including specular layers to enhance the specular reflection of electrons traversing sensor 72.

Back specular layer 74 serves to counteract electron scattering loss occurring at the back sidewall of CIP sensor 72. After the stripe height of CIP sensor 72 has been defined, back specular layer 74 is formed by depositing a layer of an oxidizable metal, such as aluminum, chromium, tantalum, titanium, or silicon, upon the back sidewall of CIP sensor 72 and then oxidizing the metal layer using an oxidation method such as plasma oxidation or oxygen radical oxidation. After back specular layer 74 has been oxidized, second gap layer 26 is deposited over CIP sensor 72, thus resulting in back specular layer 74 being positioned between the back sidewall of CIP sensor 72 and second gap layer 74. Back specular layer 74 may also be formed of aluminum oxide. Back specular layer 74 preferably has a thickness in a range of about 5 Angstroms to about 100 Angstroms.

To minimize the possibility of inadvertently oxidizing a critical layer of CIP sensor 72, a thin layer copper may be deposited prior to the deposition of back specular layer 74. This thin copper layer will preferably have a thickness less than about 10 Angstroms.

Figure 4:
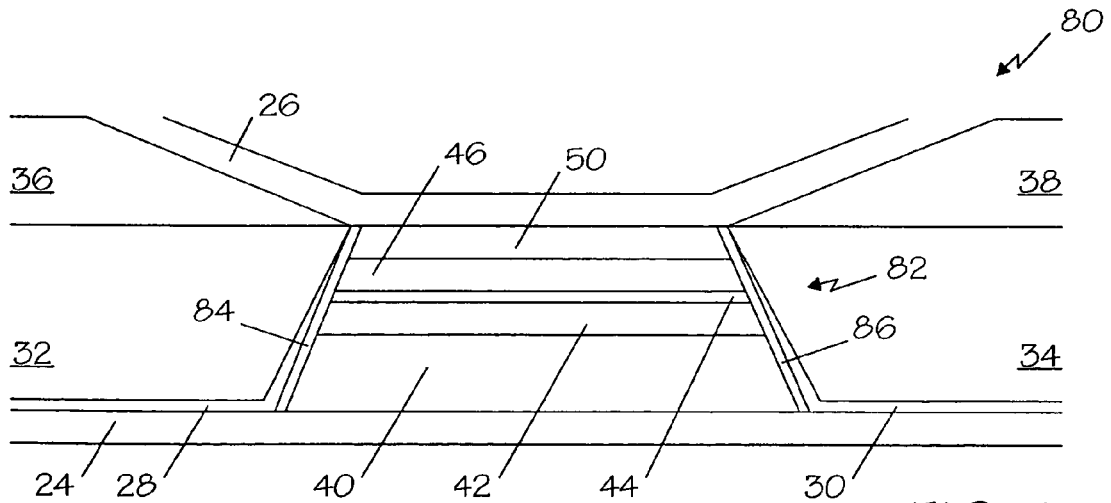
FIG. 4 is an air bearing view of a magnetic recording head in accord with the present invention and having a current-in-plane magnetoresistive sensor with specular layers positioned upon first and second sidewalls of the sensor.

FIG. 4 is an air bearing view of a magnetic recording head 80 in accord with the present invention. For ease of description, elements of FIG. 4 that are similar to elements of FIGS. 1A and 1B are similarly numbered and are not separately discussed below.

Magnetic recording head 80 includes multilayered CIP MR sensor 82, first and second gap layers 24 and 26, first and second seed layers 28 and 30, first and second bias elements 32 and 34, first and second contacts 36 and 38, and first and second specular layers 84 and 86 respectively positioned upon a first sidewall and a second sidewall of sensor 82. The first and second sidewalls each traverse the layers of CIP sensor 82 on opposite sides of CIP sensor 82. The first and second sidewalls intersect the ABS at an angle greater than 0 degrees.

CIP sensor 82 may be any multilayered CIP GMR sensor. However, for illustrative purposes only, CIP sensor 82 is shown as a spin valve sensor having sequentially stacked antiferromagnetic layer 40, SAF 42, spacer layer 44, fi-ee layer 46, and cap layer 50. CIP sensor 82 may also include any of a number of additional layers, including specular layers to enhance the specular reflection of electrons traversing sensor 82.

First and second specular layers 84 and 86 serve to counteract electron scattering loss occurring at the first and second sidewalls of CIP sensor 82. After a sensor width of CIP sensor 82 has been defined, first and second specular layers are deposited upon a respective one of the first and second sidewalls of CIP sensor 82. Next, first and second seed layers 28 and 30 are deposited over uncovered portions of first gap layer 24 and over a respective one of first and second specular layers 84 and 86. First and second bias elements 32 and 34 are grown upon a respective one of first and second seed layers 28 and 30. Next, first and second contacts 36 and 38 are patterned over a respective one of first and second bias elements 32 and 34.

Because first and second specular layers 84 and 86 lie in the path of sense current between first and second contacts 36 and 38 through CIP sensor 82, first and second specular layers 84 and 86 are preferably formed of a specular material having good electrical conductivity. To further increase the MR effect of CIP sensor 82, the material used to form first and second specular layers 84 and 86 will preferably also have good spin polarization properties such that electrons traversing CIP sensor 82 have a single spin orientation. Accordingly, first and second specular layers 84 and 86 are preferably formed of a cobalt-iron alloy having an iron composition of about 10 atomic percent to about 80 atomic percent. First and second specular layers 84 and 86 preferably have a thickness in a range of about 20 Angstroms to about 100 Angstroms. FIGS. 2-4 illustrate three different embodiments of a magnetic recording head having a CIP MR sensor in accord with the present invention. Each of these embodiments includes at least one specular layer on a different sidewall of the CIP sensor: the air bearing sidewall (FIG. 2), the back sidewall (FIG. 3), and the first and second sidewalls (FIG. 4). The present inventors contemplate that a magnetic recording head of the present invention may incorporate specular layers on any one or any combination of these four sidewalls. Moreover, to the extent that a CIP sensor has shape other than rectangular (such as triangular, for example), the present inventors contemplate the MR effect of the sensor will similarly be improved by the placement of specular layers on at least one sidewall of the sensor.

Figure 5A:
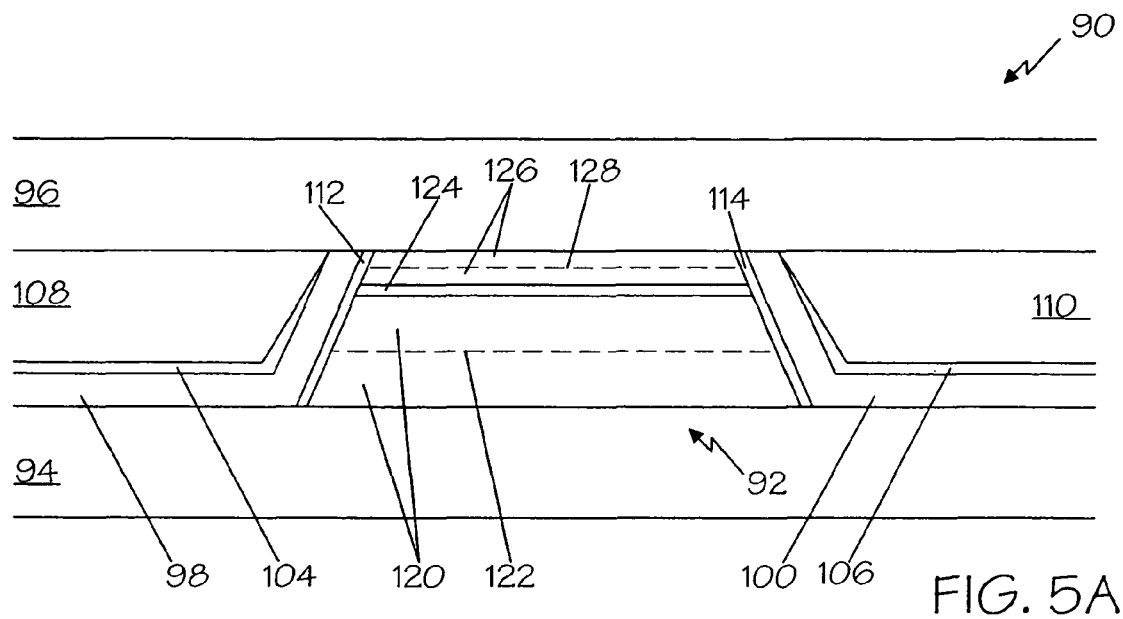
Figure 5B:
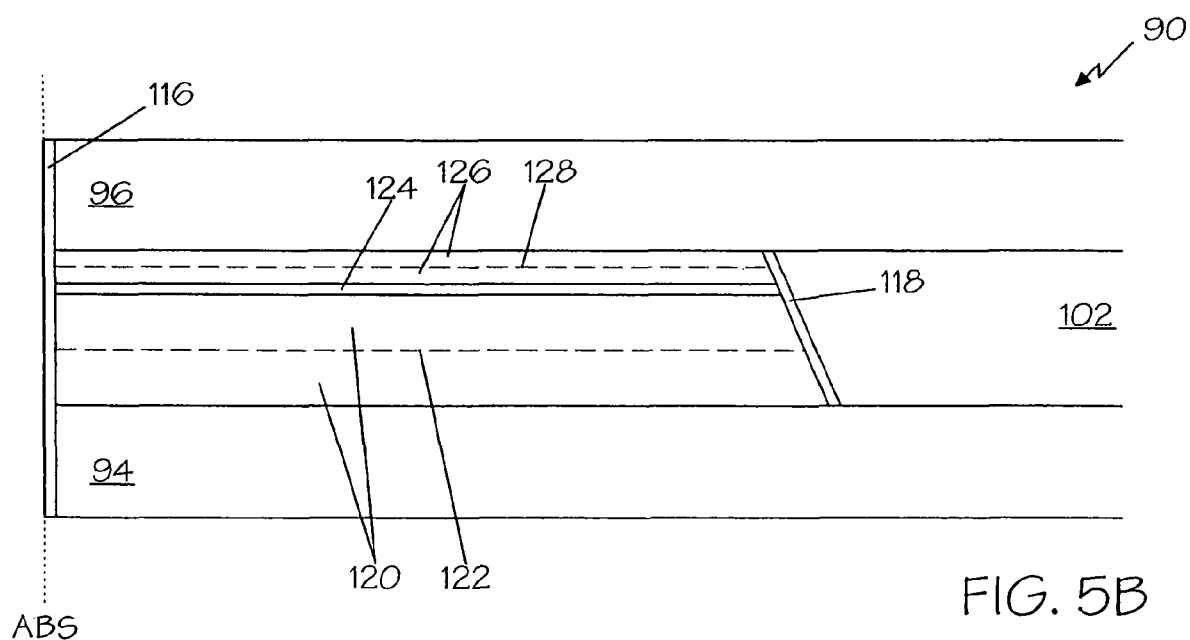
FIG. 5B is a cross-sectional view, of a magnetic recording head in accord with the present invention and having a current-perpendicular-to-plane magnetoresistive sensor with specular layers positioned upon its sidewalls.

FIG. 5A is an air bearing view, while FIG. 5B is a cross-sectional view, of magnetic recording head 90 in accord with the present invention. Magnetic recording head 90 having current-perpendicular-to-plane (CPP) MR sensor 92; first and second contacts 94 and 96; first, second, and back isolation layers 98, 100, and 102; first and second seed layers 104 and 106; first and second bias elements 108 and 110; first and second side specular layers 112 and 114; air bearing specular layer 116; and back specular layer 118.

CPP sensor 92 may be any multilayered CPP TMR sensor. Such sensors are well known in the art of magnetic recording head design. CPP sensor 92 includes sequentially-layered stack layers 120 with bottom half-metal layer 122 interspersed therein, free layer 124, and cap layer 126 with top half-metal layer 128 interspersed therein.

CPP sensor 92 is positioned between first and second contacts 94 and 96 such that current travels through CPP sensor 92 in a direction substantially normal to the layers thereof. First and second bias elements 108 and 110, which are grown upon a respective one of first and second seed layers 104 and 106, are positioned on opposite sides of CPP sensor 92 to provide longitudinal bias to free layer 124 of CPP sensor 92. To prevent the shunting of sense current from CPP sensor 92 to first and second bias elements 108 and 110, CPP sensor 92 is electrically isolated from each of first and second bias elements 108 and 110 via a respective one of first and second isolation layers 98 and 100. Back isolation layer 102 is positioned behind CPP sensor 92 opposite an ABS of magnetic recording head 90.

CPP sensor 92 includes first and second half-metal layers 122 and 128 to increase spin polarization of electrons traversing CPP sensor 92 and to also increase the resistance of CPP sensor 92. First and second half-metal layers 122 and 128 are preferably formed of a half-metal film such as $Fe_3O_4$, $CrO_2$, NiMnSb, $LaBaMnO_3$, $Sr_2FeMoO_6$, $Sr_2FeReO_6$, or the like having a thickness of about 5 Angstroms to about 50 Angstroms. First and second half-metal layers 122 and 128 may be deposited by any of a number of deposition processes, including but not limited to pulsed laser deposition, RF sputtering, and molecular beam epitaxial growth. Although CPP sensor 92 having first and second half-metal layers 122 and 128 result in a greater MR effect than sensors not having these layers, the present inventors contemplate the application of their invention to all types of TMR sensor.

CPP sensor 92 includes at least four sidewalls: an air bearing sidewall adjacent an ABS of magnetic recording head 90, a back sidewall opposite the ABS, and first and second sidewalls opposite each other and each intersecting the ABS at an angle greater than 0 degrees.

First and second specular layers 112 and 114 serve to counteract electron scattering loss occurring at the first and second sidewalls of CPP sensor 92. After a sensor width of CPP sensor 92 has been defined, first and second specular layers 112 and 114 are deposited upon a respective one of the first and second sidewalls of CPP sensor 92.

Air bearing specular layer 116 serves to counteract electron scattering loss occurring at the air bearing sidewall of CPP sensor 92. For ease of fabrication, air bearing specular layer 116 coats the ABS of magnetic recording head 90; however, air bearing specular layer 116 may also be deposited to cover only the air bearing sidewall of CPP sensor 92.

Back specular layer 118 serves to counteract electron scattering loss occurring at the back sidewall of CPP sensor 92. After the stripe height of CPP sensor 92 has been defined, back specular layer 118 is formed upon the back sidewall of CPP sensor 92

Each of first, second, air bearing, and back specular layers 112, 114, 116, and 118 are formed by depositing a layer of an oxidizable metal, such as aluminum, chromium, tantalum, or silicon, upon the respective sidewall of CPP sensor 92 and then oxidizing the metal layer using an oxidation method such as plasma oxidation or oxygen radical oxidation. Each of first, second, air bearing, and back specular layers 112, 114, 116, and 118 may also be formed of aluminum oxide. First, second, and back specular layers 112, 114, and 118 preferably have a thickness in a range of about 5 Angstroms to 100 Angstroms (and possibly even greater), while air bearing specular layer 116 preferably has a thickness in a range of about 5 Angstroms to about 20 Angstroms.

To minimize the possibility of inadvertently oxidizing a critical layer of CPP sensor 92, a thin layer copper may be deposited prior to the deposition of any of first, second, air bearing, or back specular layer 112, 114, 116, or 118. This thin copper layer will preferably have a thickness less than about 10 Angstroms.

When fabricating magnetic recording head 90, an overcoat is generally deposited over the ABS to protect magnetic recording head 90. Thus, an important consideration in selecting a material with which to form air bearing specular layer 116 is whether the material will adhere well with the material forming the overcoat, which is generally carbon or diamond-like-carbon.

FIGS. 5A and 5B illustrate a single embodiment of a magnetic recording head having a CPP MR sensor in accord with the present invention. In this embodiment, each sidewall of the MR sensor is coated with a specular layer. However, the present inventors contemplate that a magnetic recording head of the present invention may incorporate specular layers on any one or any combination of these four sidewalls. Moreover, to the extent that a CPP sensor has shape other than rectangular (such as triangular, for example), the present inventors contemplate the MR effect of the sensor will similarly be improved by the placement of specular layers on at least one sidewall of the sensor.

While the present disclosure is directed toward magnetic recording head, or transducing head, applications, the MR device of the present invention having specular layers positioned upon at least one of its sidewalls may also be incorporated in a solid state memory device, such as a magnetic random access memory (MRAM), or any other apparatus that makes use of MR devices. As with magnetic recording heads, as the storage density of magnetic memory devices decreases, it becomes more important to minimize diffusive electron scattering occurring at the sidewalls of the MR device, and thus improve the amplitude of the MR signal and decrease magnetic noise in the MR signal.

Figure 6:
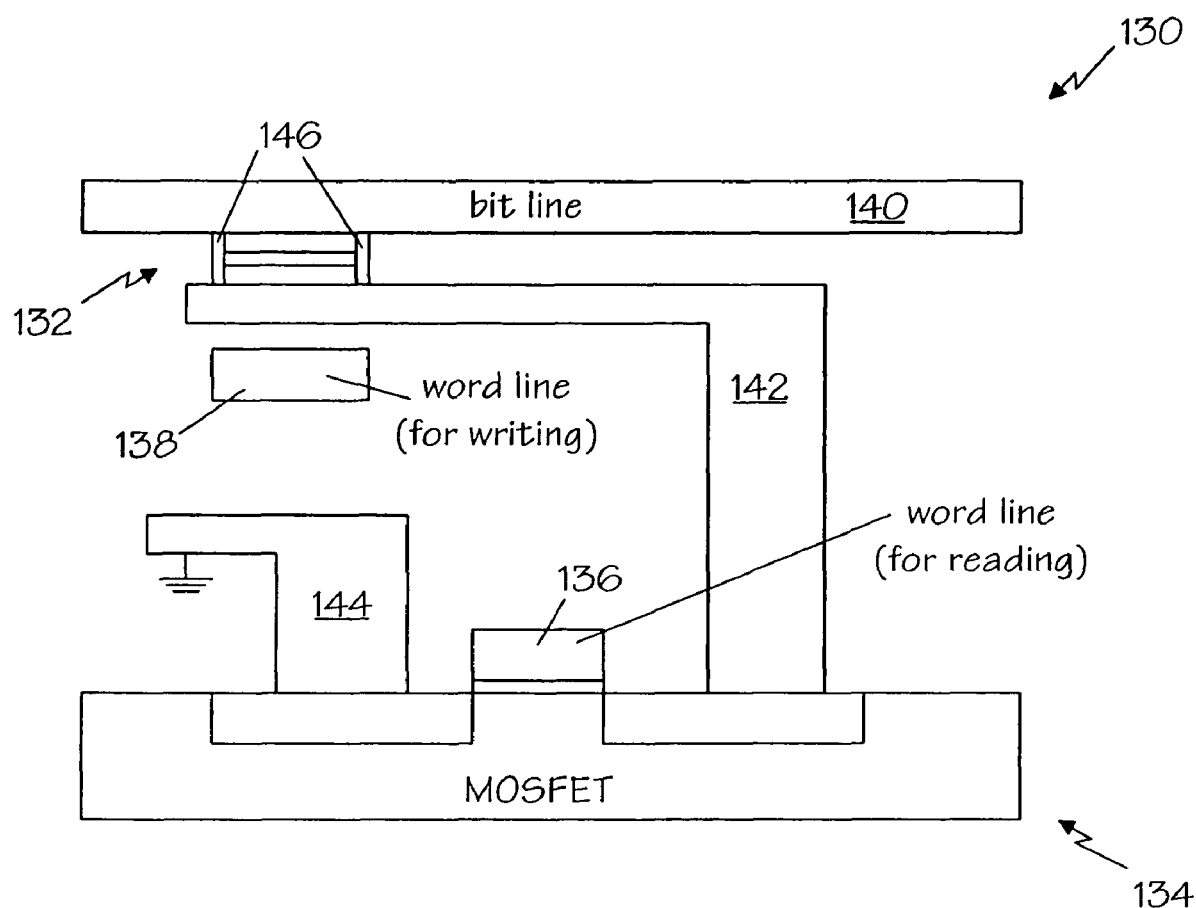
FIG. 6 is a cross-sectional view of a magnetic random access memory having a tunneling magnetoresistive device.

MRAMs are memories in which data can be stored under an address and also be read out again. The memories generally have one or more memory cells. In each cell, the memory effect resides in a MR device therein. FIG. 6 is a cross-sectional view of individual memory cell 130 of an MRAM having TMR device 132, MOSFET 134 (including gate 136, or read word line 136), write word line 138, bit line 140, and vias 142 and 144. TMR device 132 is a multilayered magnetoresistive device having specular layers 146 positioned upon its sidewalls to minimize diffusive electron scattering that may occur at the sidewalls of TMR device 132.

Memory cell 130 is part of a larger array, not shown, that includes a plurality of write word lines and bit lines arranged in a grid, such that a selected memory cell can be written to by supplying a current to both the specific write word line and bit line that crossover the selected memory cell. In the example of FIG. 6, current is supplied through write word line 138 and bit line 140 to write data to memory cell 130. The electric current flowing in write word line 138 and bit line 140 creates a magnetic field, which in turn acts upon TMR device 132 to write data thereto. The content of TMR device 132 is read by supplying a current through it to ascertain the resistance thereof. Accordingly, to read data from TMR device 32, current is provided to bit line 140, and read word line 136 is activated to allow current to progress from bit line 140, TMR device 132, via 142, and MOSFET 134. A source terminal of MOSFET 134 is electrically connected to TMR device 132 through via 142, while a drain terminal of MOSFET 134 is grounded through via 144.

To summarize, the present invention is a multilayered MR device having several sidewalls transverse to the layers of the MR device, in which at least one of the sidewalls is coated with a specular layer. The positioning of specular layers on the sidewalls minimizes diffusive electron scattering that may occur at the sidewalls of the sensor, and thus improves the amplitude of the MR signal and decreases magnetic noise in the MR signal.

Although the present invention has been described with reference to preferred embodiments, workers skilled in the art will recognize that changes may be made in form and detail without departing from the spirit and scope of the invention.

The invention claimed is:

1. A magnetoresistive device comprising:
   a multilayered magnetoresistive stack having a plurality of layers and a plurality of sidewalls, the plurality of layers including a top layer and a bottom layer opposite the top layer, wherein the plurality of sidewalls traverse the plurality of layers from the bottom layer to the top layer; and
   a first specular layer positioned upon a first sidewall of the plurality of sidewalls and a first copper layer positioned between the first specular layer and the first sidewall, wherein the first specular layer and the first copper layer are transverse to the plurality of layers of the multilayered magnetoresistive stack.

2. The magnetoresistive device of claim 1, wherein the first specular layer is an oxidized metallic layer.

3. The magnetoresistive device of claim 1, wherein the first copper layer has a thickness less than about 10 Angstroms.

4. The magnetoresistive device of claim 1, wherein the first specular layer has a thickness in a range of about 5 Angstroms to about 20 Angstroms.

5. The magnetoresistive device of claim 1 and further comprising a second specular layer positioned upon a second sidewall of the plurality of sidewalls and a second copper layer positioned between the second specular layer and the second sidewall, wherein the second specular layer and the second copper layer are transverse to the plurality of layers of the multilayered magnetoresistive stack.

6. The magnetoresistive device of claim 5, wherein the first and second copper layers each have a thickness less than about 10 Angstroms.

7. The magnetoresistive device of claim 1, wherein the magnetoresistive stack is a current-perpendicular-to-plane magnetoresistive element.

8. The magnetoresistive device of claim 7, wherein the magnetoresistive stack is a tunneling magnetoresistive (TMR) element.

9. The magnetoresistive device of claim 1, wherein the magnetoresistive stack is a magnetic random access memory (MRAM) storage element.

10. The magnetoresistive device of claim 9, wherein the magnetoresistive stack is connected between a bit line and a semiconductor element.

11. The magnetoresistive device of claim 10 and further comprising:
- a read word line for turning on the semiconductor element to read the magnetoresistive stack; and
- a write word line adjacent the magnetoresistive stack for writing to the magnetoresistive stack.

12. A magnetoresistive device comprising:
- a multilayered magnetoresistive stack having a plurality of layers and first and second sidewalls, the plurality of layers including a top layer and a bottom layer opposite the top layer, wherein the first and second sidewalls traverse the plurality of layers from the bottom layer to the top layer;
- a first specular layer positioned upon the first sidewall;
- a first copper layer positioned between the first specular layer and the first sidewall, wherein the first copper layer and the first specular layer traverse the plurality of layers of the multilayered magnetoresistive stack;
- a second specular layer positioned upon the second sidewall; and
- a second copper layer positioned between the second specular layer and the second sidewall, wherein the second copper layer and the second specular layer traverse the plurality of layers of the multilayered magnetoresistive stack.

13. The magnetoresistive device of claim 12, wherein the first and second specular layers are oxidized metallic layers.

14. The magnetoresistive device of claim 12, wherein the first and second specular layers have a thickness in a range of about 5 Angstroms to about 20 Angstroms, and wherein the first and second copper layers each have a thickness less than about 10 Angstroms.

15. The magnetoresistive device of claim 12, wherein the magnetoresistive stack is a tunneling magnetoresistive (TMR) element.

16. The magnetoresistive device of claim 12, wherein the magnetoresistive stack is connected between a bit line and a semiconductor element.

17. The magnetoresistive device of claim 16 and further comprising:
- a read word line for turning on the semiconductor element to read the magnetoresistive stack; and
- a write word line adjacent the magnetoresistive stack for writing to the magnetoresistive stack.

18. A magnetoresistive device comprising:
- a current-perpendicular-to-plane multilayered magnetoresistive stack having a plurality of layers and a plurality of sidewalls, the plurality of layers including a top layer and a bottom layer opposite the top layer, wherein the plurality of sidewalls traverse the plurality of layers from the bottom layer to the top layer;
- a first specular layer having a thickness in a range of about 5 Angstroms to about 20 Angstroms positioned upon a first sidewall of the plurality of sidewalls; and
- a first copper layer having a thickness less than about 10 Angstroms positioned between the first specular layer and the first sidewall, wherein the first copper layer and the first specular layer are transverse to the plurality of layers of the multilayered magnetoresistive stack.

19. The magnetoresistive device of claim 18, wherein the magnetoresistive stack is connected between a bit line and a semiconductor element.

20. The magnetoresistive device of claim 19 and further comprising:
- a read word line for turning on the semiconductor element to read the magnetoresistive stack; and
- a write word line adjacent the magnetoresistive stack for writing to the magnetoresistive stack.

* * * * *